(12) United States Patent
Kim (10) Patent No.: US 10,785,063 B2
(45) Date of Patent: Sep. 22, 2020

(54) UART-BASED COMMUNICATION-SPEED AUTOMATIC-SWITCHING METHOD

(71) Applicant: LSIS CO., LTD., Anyang-si, Gyeonggi-do (KR)

(72) Inventor: Hyung-Lae Kim, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 16/257,772

(22) Filed: Jan. 25, 2019

(65) Prior Publication Data
US 2019/0238369 A1    Aug. 1, 2019

(30) Foreign Application Priority Data
Jan. 30, 2018  (KR) .................. 10-2018-0011090

(51) Int. Cl.
*H04B 3/46* (2015.01)
*H04L 25/38* (2006.01)
(Continued)

(52) U.S. Cl.
CPC ...... *H04L 25/0262* (2013.01); *G06F 13/4295* (2013.01); *H04L 1/0038* (2013.01);
(Continued)

(58) Field of Classification Search
CPC ............... H04L 25/0262; H04L 1/0038; H04L 25/0222; H04L 25/0238; H04L 47/22;
(Continued)

(56) References Cited

U.S. PATENT DOCUMENTS 5,627,858 A * 5/1997 Mak ............... H04L 25/0262
                                             370/252
5,799,208 A * 8/1998 Hwang ............ G06F 13/385
                                             370/535
(Continued)

FOREIGN PATENT DOCUMENTS

JP    S62012240 A    1/1987
JP    2010124268 A   6/2010
WO    99/48244       9/1999

OTHER PUBLICATIONS

European Search Report for related European Application No. 1915382.2; action dated Jun. 21, 2019; (6 pages).
(Continued)

*Primary Examiner* — Edan Orgad
*Assistant Examiner* — Vanneilian Lalchinthang
(74) *Attorney, Agent, or Firm* — K&L Gates LLP (57) ABSTRACT

Disclosed is a method for variably changing a communication speed by a first device when a high-speed communication request within a range supported by the first device is input from a second device during low-speed communication of the first device with a third device in the UART communication and performing data communication with the second device at the varied high speed. A method for switching, by a device, a communication speed in an universal asynchronous receiver-transmitter (UART)-based data communication includes: measuring, by an interrupt detection module of the device, a pulse width of a start bit using an interrupt signal; calculating, by a communication speed calculation module of the device, a communication speed using a time duration for which the measured pulse width is maintained; and switching, by a communication
(Continued)

speed switching module of the device, a current communication speed of the device to the calculated communication speed.

10 Claims, 8 Drawing Sheets

(51) Int. Cl.
    *H04L 25/02*     (2006.01)
    *G06F 13/42*     (2006.01)
    *H04L 1/00*     (2006.01)
    *H04L 25/05*     (2006.01)
    *H04L 12/815*     (2013.01)
    *H04L 12/825*     (2013.01)

(52) U.S. Cl.
    CPC ...... *H04L 25/0222* (2013.01); *H04L 25/0238* (2013.01); *H04L 25/05* (2013.01); *H04L 47/22* (2013.01); *H04L 47/25* (2013.01)

(58) Field of Classification Search
    CPC ..... H04L 25/05; H04L 47/25; G06F 13/4295; G06F 13/24; G06F 2213/2418
    USPC .......................................................... 370/329
    See application file for complete search history.

(56) References Cited

U.S. PATENT DOCUMENTS

| | | | | |
|---|---|---|---|---|
| 6,157,689 A * | 12/2000 | Petty | ..................... | G06F 13/385 |
| | | | | 375/222 |
| 6,529,548 B1 * | 3/2003 | Aoki | ................... | G06F 13/4295 |
| | | | | 370/252 |
| 6,704,350 B1 * | 3/2004 | Ryu | .......................... | H04L 5/14 |
| | | | | 375/222 |
| 8,654,377 B2 * | 2/2014 | Kumada | ................. | H04L 25/05 |
| | | | | 358/1.15 |
| 2003/0048862 A1 * | 3/2003 | Lee | ......................... | H04L 7/044 |
| | | | | 375/370 |
| 2015/0074306 A1 * | 3/2015 | Ayyagari | ............ | G06F 13/4295 |
| | | | | 710/110 |
| 2019/0103862 A1 * | 4/2019 | Ido | ......................... | H03F 3/217 |

OTHER PUBLICATIONS

Japanese Office Action for related Japanese Application No. 2019-010422; action dated Feb. 25, 2020; (6 pages).

* cited by examiner

UART-BASED COMMUNICATION-SPEED AUTOMATIC-SWITCHING METHOD

CROSS-REFERENCE TO RELATED APPLICATION

Pursuant to 35 U.S.C. § 119(a), this application claims the benefit of earlier filing date and right of priority to Korean Application No. 10-2018-0011090, filed on Jan. 30, 2018, in the Korean Intellectual Property Office, the disclosure of which is incorporated herein in its entirety by reference.

TECHNICAL FIELD

The present disclosure relates to UART (Universal Asynchronous Receiver Transmitter) communication. More specifically, the present disclosure relates to a method for variably changing a communication speed by a first device when a high-speed communication request within a range supported by the first device is input from a second device during low-speed communication of the first device with a third device in the UART communication and performing data communication with the second device at the varied high speed.

BACKGROUND

Generally, communication refers to a series of operations in which necessary data is sent or received between devices. UART (Universal asynchronous receiver transmitter) refers to a microchip containing a program that controls an interface to serial devices attached to a computer. The UART may communicate with or data-exchange with modems or other serial devices.

UART communication using this UART is a universal communication performed in an embedded manner in a general CPU. This communication is commonly used for communication between the devices.

However, in the UART communication, when a device supporting high-speed communication is inevitably configured to communicate at a low speed to communicate with a low-speed communication device, communication thereof with other high-speed communication devices must be performed at the low speed as previously set. In some cases, the device may not communicate with other high-speed communication devices due to a difference between communication speeds thereof.

Figure 1A:
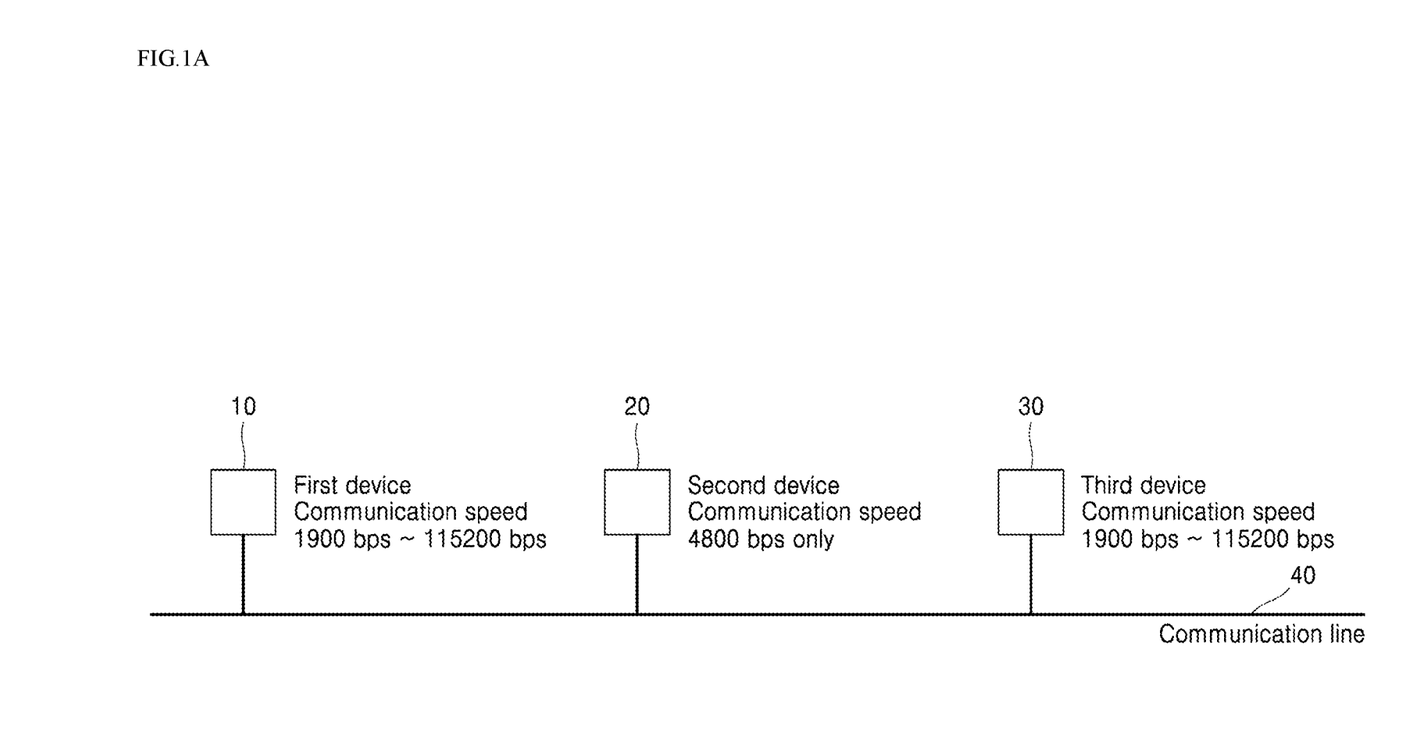
FIG. 1A, FIG. 1B, and FIG. 1C are configuration diagrams illustrating a structure in which devices with different communication speeds are connected to the same network in a prior art.
Figure 1B:
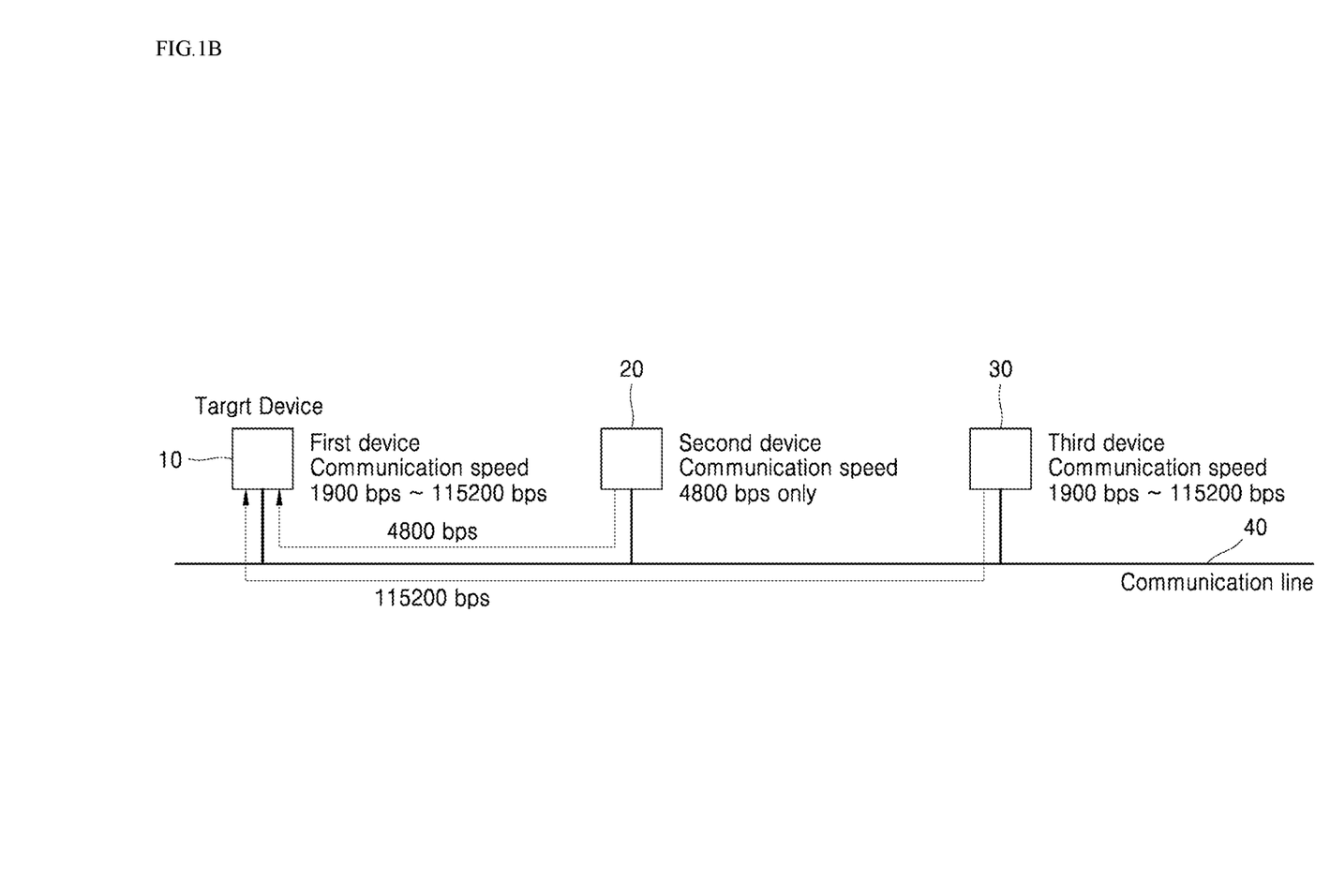
Figure 1C:
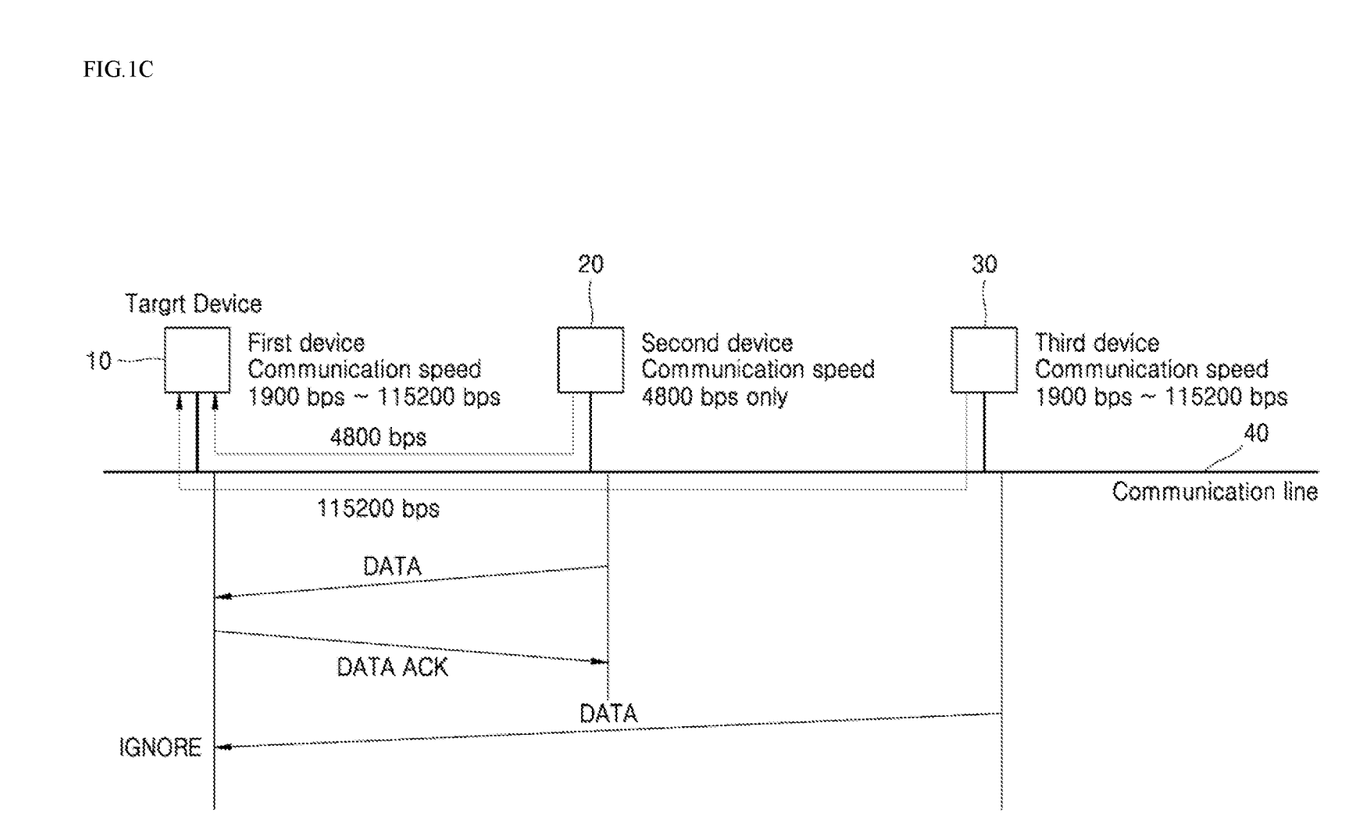

FIG. 1A, FIG. 1B, and FIG. 1C are configuration diagrams illustrating a structure in which devices with different communication speeds are connected to the same network in a prior art.

As shown in FIG. 1A, a first device 10, a second device 20 and a third device 30 are connected to one communication line 40. The first device 10 and the third device 30 support communication speeds from 1900 [bps] to 115200 [bps] while the second device 20 supports only 4800 [bps] communication speed.

Accordingly, the first device 10 is configured to communicate at a communication speed of 4800 [bps] to communicate with the second device 30. Thus, as shown in FIG. 1B, the first device 10 communicates with the second device 10 at a communication speed of 4800 [bps].

Moreover, when the first device 10 is communicating with the second device 20 at a communication speed of 4800 [bps], a communication request at a communication speed of 115200 [bps] is made from the third device 30 to the first device 10. In this connection, as shown in FIG. 1C, the first device 10 cannot communicate with the third device 30 even though the requested speed is in a communication speed range that the first device 10 supports.

This is because as the first device 10 is configured to communicate at the low communication speed 4800 [bps] for communication with the second device 20, the communication request from the third device 30 is ignored as non-interpreted due to the speed difference by the first device 10 and no response is made by the first device although the communication speed requested from the third device 30 to the first device 10 is within the communication speed range supported by the first device 10.

In the case where the set speeds are different between the devices, there is a problem in that communication cannot be made between the devices. In fact, there are cases where devices such as relatively simple sensors have different communication speeds as supported in the industrial field. In this case, such a problem causes an overall speed of the network to be slowed down.

SUMMARY

An purpose of the present disclosure is to provide a method by which when a high-speed communication request is input to a first device from a second device while a first device is being in communication with a third low-speed device, a communication speed of the first device is automatically switched to the requested high communication speed, thereby to solve the problem due to the situation that only a single speed is assigned to a network in the existing prior art.

Another purpose of the present disclosure is to provide a method for variably changing a communication speed by a first device when a high-speed communication request within a range supported by the first device is input from a second device during low-speed communication of the first device with a third device in the UART communication and performing data communication with the second device at the varied high speed.

The purposes of the present disclosure are not limited to the above-mentioned purposes. Other purposes and advantages of the present disclosure, as not mentioned above, may be understood from the following descriptions and more clearly understood from the embodiments of the present disclosure. Further, it will be readily appreciated that the objects and advantages of the present disclosure may be realized by features and combinations thereof as disclosed in the claims.

In one aspect of the present disclosure, there is provided a method for switching, by a device, a communication speed in an universal asynchronous receiver-transmitter (UART)-based data communication, the method comprising: measuring, by an interrupt detection module of the device, a pulse width of a start bit using an interrupt signal; calculating, by a communication speed calculation module of the device, a communication speed using a time duration for which the measured pulse width is maintained; and switching, by a communication speed switching module of the device, a current communication speed of the device to the calculated communication speed.

In one embodiment, the measuring of the pulse width includes: sampling all of interrupt signals occurring from a time of a rising edge of the start bit and for a duration of a high level of the start bit or occurring from a time of a falling edge of the start bit and for a duration of a low level of the start bit; and measuring the pulse width of the start bit using a number of all of the sampled interrupt signal and a predetermined period in which the interrupt signals is transmitted to the interrupt detection module.

In one embodiment, the measuring of the pulse width includes: detecting a first interrupt signal and a last interrupt signal among all of interrupt signals, wherein all of the signals occur from a time of a rising edge of the start bit and for a duration of a high level of the start bit or occur from a time of a falling edge of the start bit and for a duration of a low level of the start bit; and measuring the pulse width of the start bit using a detection time of the first interrupt signal and a detection time of the last interrupt signal.

In one embodiment, the calculating of the communication speed includes calculating the communication speed by calculating a number of pulses occurring for a predetermined time using the time duration for which the measured pulse width of the start bit is maintained.

In one embodiment, the calculating of the communication speed includes calculating the communication speed using a following equation:

$$P_{width} = \frac{1000000 \text{ μs}}{COM_{speed}},$$

where $P_{width}$ indicates a time duration for which the low or high level of the start bit is maintained, $COM_{speed}$ indicates a communication speed, and 1000000 μs corresponds to one second.

In one embodiment, the switching of the current communication speed to the calculated communication speed includes: comparing the calculated communication speed with the current communication speed; upon determination from a result of the comparison that the calculated communication speed and current communication speed are different from each other, switching the current communication speed to the calculated communication speed; or upon determination from a result of the comparison that the calculated communication speed and current communication speed are the same, maintaining the current communication speed.

In one embodiment, the switching of the current communication speed to the calculated communication speed includes: when an available maximum communication speed of the device is lower than the calculated communication speed, switching the current communication speed to the available maximum communication speed.

In one embodiment, the method further comprises: supporting data communication at the switched communication speed and receiving data at the switched communication speed; and, upon reception of an end bit, terminating a current communication of the device.

In one embodiment, the method further comprises: upon the termination of the current communication, returning the switched communication speed to the current communication speed.

According to the UART communication-speed automatic-switching method according to the present disclosure, a communication speed of a corresponding device is automatically switched to a communication speed requested from another device within a speed range supported by the corresponding device. As a result, both of low-speed communication and high-speed communication may be realized.

This may remove the problem that the corresponding device that supports high-speed communication is configured to communicate at a low speed to communicate with a low-speed communication device, and, thus, communication of the corresponding device with a high-speed communication device may be performed at a low-speed.

Therefore, in the structure in which devices having different communication speeds are connected to the same network, communication speeds of low-speed communication devices as well as communication speeds of high-speed communication devices can be realized. Thus, factors that slow down the overall speed of the network are eliminated, which may provide the fast communication speed across the network.

Further specific effects of the present disclosure as well as the effects as described above will be described in conduction with illustrations of specific details for carrying out the invention.

DETAILED DESCRIPTION

The above objects, features and advantages will become apparent from the detailed description with reference to the accompanying drawings. Embodiments are described in sufficient detail to enable those skilled in the art in the art to easily practice the technical idea of the present disclosure. Detailed descriptions of well-known functions or configurations may be omitted in order not to unnecessarily obscure the gist of the present disclosure. Hereinafter, embodiments of the present disclosure will be described in detail with reference to the accompanying drawings. Throughout the drawings, like reference numerals refer to like elements.

Hereinafter, the UART communication-speed automatic-switching method according to some embodiments of the present disclosure will be described with reference to FIG. 2 to FIG. 7.

Figure 2:
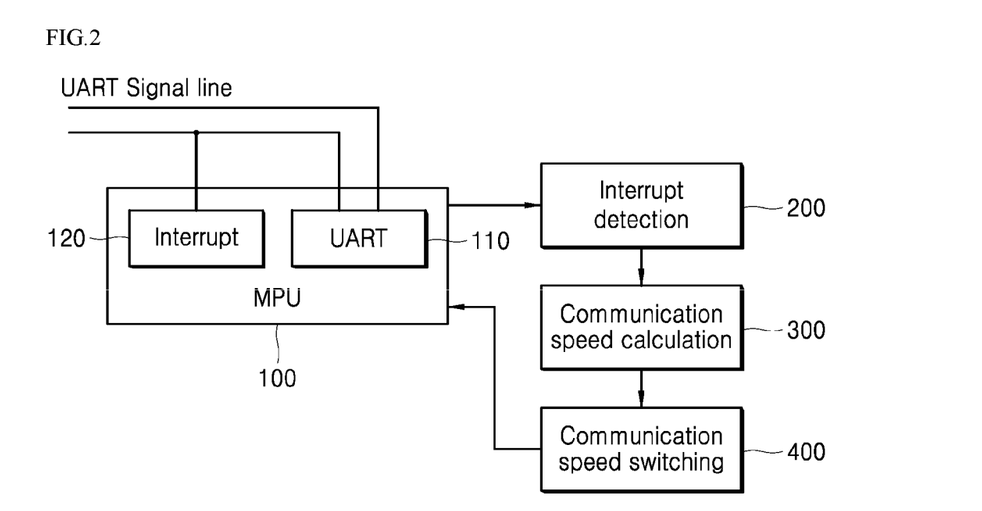
FIG. 2 shows a configuration of a device for UART communication speed automatic-switching according to an embodiment of the present disclosure.
Figure 3:
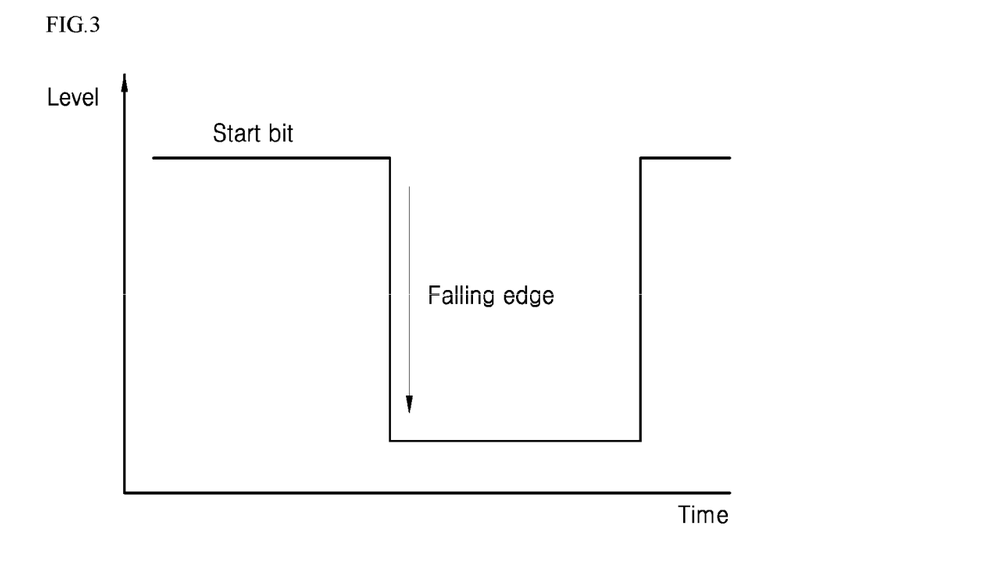
FIG. 3 shows a start bit characteristic for identifying a communication speed by an interrupt detection module of FIG. 2.

FIG. 2 shows a configuration of a device for UART communication speed automatic-switching according to an embodiment of the present disclosure. FIG. 3 shows a start bit characteristic for identifying a communication speed by an interrupt detection module of FIG. 2.

Referring to FIG. 2, a device for performing the method may include an MPU (microprocessor unit) 100 including an interrupt module 120 and an UART 110, the interrupt module being connected to any one of UART signal lines connected to the UART 110; an interrupt detection module 200 for measuring a pulse width of a start bit using an interrupt signal provided from the interrupt module 120; a communication speed calculation module 300 for calculating a communication speed using the pulse width of the start bit measured by the interrupt detection module 200; and a communication speed switching module 400 for switching a current communication speed to the communication speed calculated by the communication speed calculation module 300. In FIG. 2, the interrupt detection module 200, the communication speed calculation module 300, and the communication speed switching module 400 are arranged separately from the MPU 100. The present disclosure is not limited thereto. At least one of the interrupt detection module 200, the communication speed calculation module 300, and the communication speed switching module 400 may be included in the MPU 100.

In this connection, the MPU 100 includes the UART 110 and interrupt module 120. First and second UART signal lines input from an outside are connected to the UART 110. One of the first and second UART signal lines connected to the UART 110 is connected to the interrupt module 120.

Further, when a start bit is detected, the interrupt detection module 200 measures a interrupt signal provided from the interrupt module 120 using a falling edge or a rising edge, as shown in FIG. 3. The interrupt detection module 200 measures a pulse width of the start bit using the measured interrupt signal. In this connection, the start bit typically goes down from a high level to a low level once and then goes up from a low level to a high level. Therefore, using time information of the interrupt signal measured during the low level of the start bit may allow the pulse width of the start bit to be measured.

The method of measuring the pulse width of the start bit using the interrupt signal by the interrupt detection module 200 may be various. In a preferred embodiment of the present disclosure, following two approaches will be described. However, it is to be understood that the present disclosure is not limited thereto but the method may be variously embodied in a technical spirit thereof.

Figure 4:
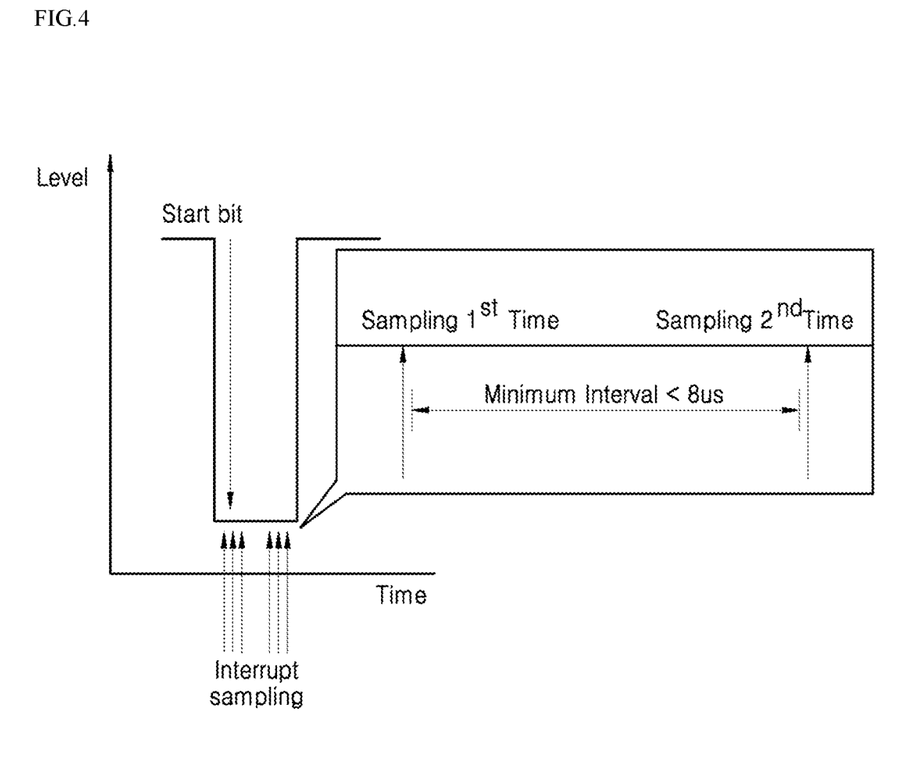
FIG. 4 shows an example of a method for measuring a pulse width of the start bit by the interrupt detection module of FIG. 2.

FIG. 4 is directed to a first embodiment of the method for measuring the pulse width of the start bit by the interrupt detection module of FIG. 2.

As shown in FIG. 4, when the start bit is detected, the interrupt detection module 200 receives and samples all of the interrupt signals provided from the interrupt module 120 from a time of the falling edge and during the start bit is at a low level. In this connection, the interrupt signal provided from the interrupt module 120 is provided at a regular interval until the start bit rises from a low level to a high level. The interrupt signal supply stops after rising to the high level. In FIG. 4, a period of a first sampling interrupt signal and a second sampling interrupt signal is 8 [μs]. However, the period may vary depending on the interrupt module 120 and the communication speed. The period of the interrupt signal is set and then fixed. Alternatively, the period of the interrupt signal may be constant during a single communication between devices.

The interrupt detection module 200 measures the pulse width of the start bit using the number of interrupt signals sampled in this manner and a predetermined period for which the interrupt signal is provided.

Figure 5:
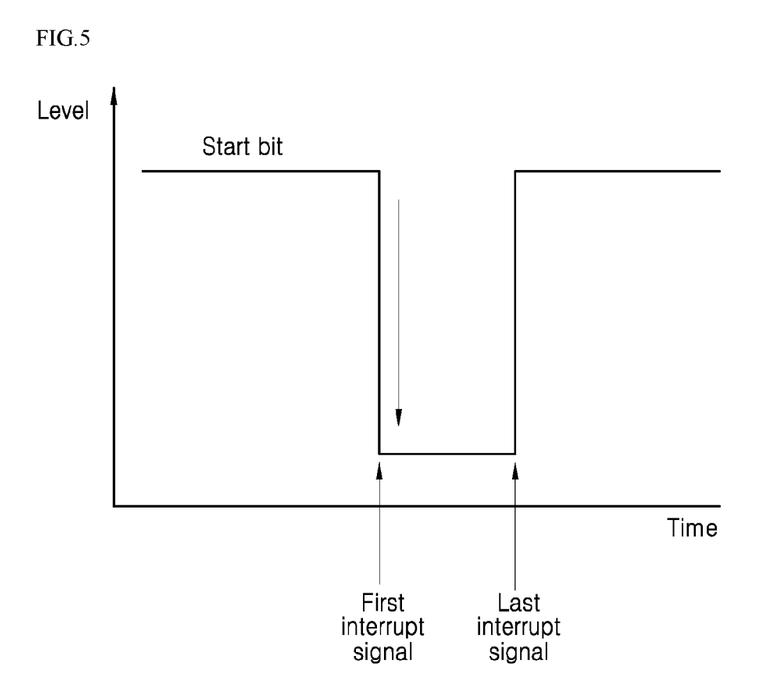
FIG. 5 shows another embodiment of a method for measuring the pulse width of the start bit by the interrupt detection module of FIG. 2.

FIG. 5 is directed to a second embodiment of the method for measuring the pulse width of the start bit in the interrupt detection module of FIG. 2.

As shown in FIG. 5, when the start bit is detected, the interrupt detection module 200 detects only a first interrupt signal and a last interrupt signal among the interrupt signals provided from the interrupt module 120 from a time of the falling edge and during the start bit is at the low level. In this connection, the interrupt detection module 200 detects a time at which the first interrupt signal was detected and a time at which the last interrupt signal was detected.

The interrupt detection module 200 measures the pulse width of the start bit using the time at which the first interrupt signal was detected and the time at which the last interrupt signal was detected.

The communication speed calculation module 300 calculates how many pulses occur for a predetermined time (e.g., 1 second) using a duration for which the pulse width of the start bit measured by the interrupt detection module 200 is maintained. The communication speed calculation module 300 calculates a communication speed using the number of pulses as measured. A following Equation 1 represents a formula for calculating the communication speed:

$$P_{width} = \frac{1000000 \text{ μs}}{COM_{speed}} \qquad \text{[Equation 1]}$$

In this connection, $P_{width}$ refers to the time duration for which the low or high level of the start bit is maintained $COM_{speed}$ refers to the communication speed. 1000000 μs refers to one second.

The communication speed calculation module 300 calculates the communication speed using the Equation 1. When the time duration for which the low level is maintained is 833 [μs], the communication speed is calculated to be 1200 [bps]. When the time duration for which the low level is maintained is 8.6 [μs], the communication speed is calculated to be 115200 [bps].

The communication speed switching module 400 compares the communication speed calculated by the communication speed calculation module 300 with a currently set communication speed. When the two speeds are different from each other, the current communication speed is automatically switched to the calculated communication speed.

Accordingly, when the present disclosure is applied, high-speed data communication can be performed with a device supporting high-speed communication, whereas, low-speed data communication can be performed with a device supporting low-speed data communication. This may construct the more effective network.

Operations of the device for the UART communication-speed automatic-switching according to an embodiment of the present disclosure as thus-configured will be described in detail with reference to the accompanying drawings. The reference numerals as in FIGS. 1A to 1C and FIG. 2 refer to the same members performing the same function in the following drawings.

Figure 6:
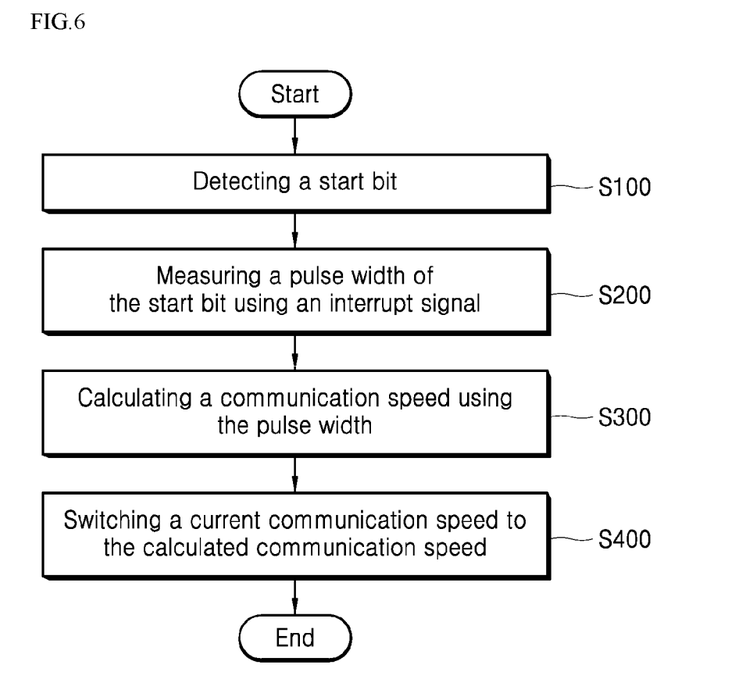
FIG. 6 shows a flowchart for illustrating a UART communication speed automatic-switching method according to an embodiment of the present disclosure.

FIG. 6 is a flow chart for describing the UART communication-speed automatic-switching method according to an embodiment of the present disclosure.

Referring to FIG. 6, first, when the start bit is detected S100, the interrupt detection module 200 measures the pulse width of the start bit using the interrupt signal provided from the interrupt module 120 S200.

In this connection, the pulse width of the start bit is as shown in FIG. 3. The pulse width of the start bit is measured using a falling edge or rising edge resulting from measuring the interrupt signal provided from the interrupt module 120. In this connection, the start bit typically goes down from a high level to a low level once and then goes up from a low level to a high level. Therefore, using time information of the interrupt signal measured during the low level of the start bit may allow the pulse width of the start bit to be measured.

The method of measuring the pulse width of the start bit using the interrupt signal by the interrupt detection module 200 may be various. In a preferred embodiment of the present disclosure, following two approaches will be described. However, it is to be understood that the present disclosure is not limited thereto but the method may be variously embodied in a technical spirit thereof.

In a first approach, as shown in FIG. 4, when the start bit is detected, the interrupt detection module 200 receives and samples all of the interrupt signals provided from the interrupt module 120 from a time of the falling edge and during the start bit is at a low level. In this connection, the interrupt signal provided from the interrupt module 120 is provided at a regular interval until the start bit rises from a low level to a high level. The interrupt signal supply stops after rising to the high level. In FIG. 4, a period of a first sampling interrupt signal and a second sampling interrupt signal is 8 [μs]. However, the period may vary depending on the interrupt module 120 and the communication speed. The period of the interrupt signal is set and then fixed. Alternatively, the period of the interrupt signal may be constant during a single communication between devices. The interrupt detection module 200 measures the pulse width of the start bit using the number of interrupt signals sampled in this manner and a predetermined period for which the interrupt signal is provided.

In a second approach, as shown in FIG. 5, when the start bit is detected, the interrupt detection module 200 detects only a first interrupt signal and a last interrupt signal among the interrupt signals provided from the interrupt module 120 from a time of the falling edge and during the start bit is at the low level. In this connection, the interrupt detection module 200 detects a time at which the first interrupt signal was detected and a time at which the last interrupt signal was detected. The interrupt detection module 200 measures the pulse width of the start bit using the time at which the first interrupt signal was detected and the time at which the last interrupt signal was detected.

Then, the communication speed calculation module 300 calculates the communication speed using the measured pulse width of the start bit S300.

More specifically, the communication speed calculation module 300 calculates how many pulses occur for a predetermined time (e.g., 1 second) using a duration for which the pulse width of the start bit measured by the interrupt detection module 200 is maintained. The communication speed calculation module 300 calculates a communication speed using the number of pulses as measured. The communication speed calculation module 300 calculates the communication speed using the Equation 1.

In one example, when the time duration for which the low level is maintained is 833 [μs], the communication speed is calculated to be 1200 [bps]. When the time duration for which the low level is maintained is 8.6 [μs], the communication speed is calculated to be 115200 [bps].

Next, the communication speed switching module 400 switches the current communication speed to the calculated communication speed S400. More specifically, the communication speed switching module 400 compares the communication speed calculated by the communication speed calculation module 300 with a currently set communication speed. When the two speeds are different from each other, the current communication speed is automatically switched to the calculated communication speed.

A preferred embodiment of the operation 400 is described in detail below.

Figure 7:
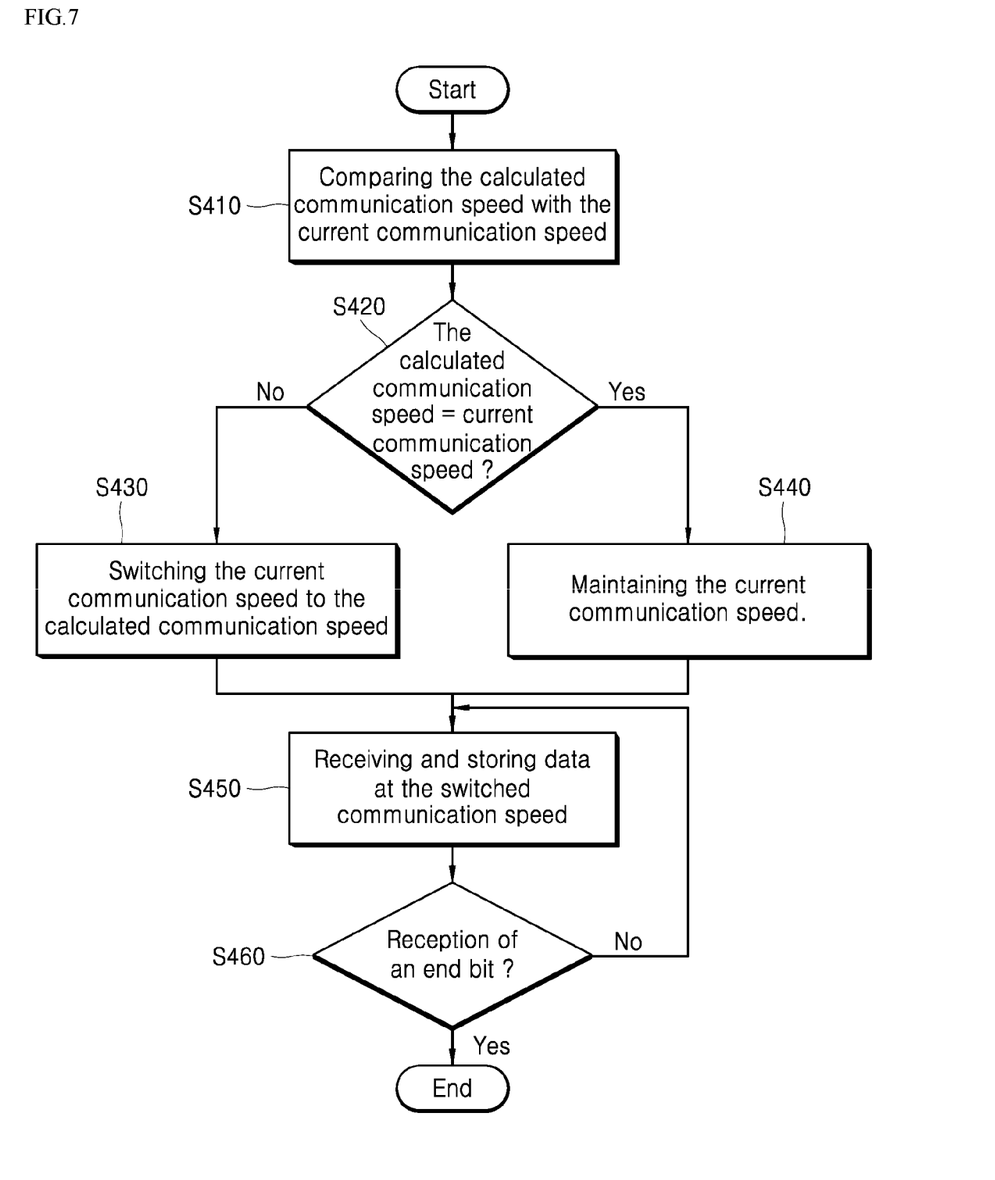
FIG. 7 shows a flow chart for illustrating a communication speed switching process of FIG. 6 in detail.

FIG. 7 is a flow chart detailing the process of switching the communication speed in FIG. 6.

As shown in FIG. 7, first, the communication speed calculated from the communication speed calculation module 300 is compared with the currently set communication speed S410.

When, from the comparison result, the calculated communication speed and current communication speed are different from each other S420, the current communication speed is switched to the calculated communication speed S430.

That is, in FIG. 1B, the first device 10 communicates with the second device 20 at a communication speed of 4800 [bps]. Thereafter, a communication request is made from the third device 30. At this time, a communication speed of the first device 10 is currently set to the communication speed of 4800 [bps], and the communication speed requested from the third device 30 is 115200 [bps]. Therefore, the communication speed of the first device 10 is switched to the calculated communication speed of 115200 [bps]. In this connection, a device that is configured to communicate only at a communication speed of 4800 [bps], such as the second device 20 will communicate only at 4800 [bps] as the communication speed that is supported by the second device 20, although the communication speed of another device, that is, the first or third device, is switched to a different communication speed (e.g., 115200 [bps]). In this connection, when the second device 20 has a maximum supported communication speed of 19200 [bps], the current communication speed of the second device is switched to 19200 [bps] which is the highest communication speed available.

Further, when, from the comparison result, the calculated communication speed and the current communication speed are equal to each other S420, the method maintains the current communication speed S440.

The first device supports data communication at the increased communication speed and receives and stores the data S450.

The first device then receives and stores all data until an end bit arrives. When the end bit arrives after the completion of transmission of all data S460, it is determined that communication between current devices is completed and the process ends. In this connection, the end bit, like the start bit, goes down from the high level to the low level and then goes up again. Because the data reaches on a 7 bits or 8 bits basis according to the setting, the end bit arriving after the data transmission is completed may be checked easily.

In one example, when it is determined that the current communication has been completed since the end bit has arrived, a target device whose the current communication speed is changed may maintain the changed communication speed or may be configured to return to the previous communication speed. This may depend on a communication speed, a data transmission amount, the number of data transmission times, and the like of each of devices having different communication speeds connected to the same network.

Accordingly, when the present disclosure is applied, high-speed data communication can be performed with a device supporting high-speed communication, while low speed data communication can be performed with a device that supports low-speed data communication. Thus, a more effective network can be constructed.

Hereinafter, a scenario will be described in which the above-mentioned UART communication-speed automatic-switching method is applied to the network structure as in the configuration of FIG. 1A, FIG. 1B, and FIG. 1C, where the first device 10 and third device 30 supporting communication speeds of from 1900 [bps] to 115200 [bps], and the second device 20 supporting only a communication speed of 4800 [bps] are connected to the same network.

First, while the second device 20 is communicating with the first device 10 at a communication speed of 4800 [bps], the third device 30 attempts to transmit data to the first device 10 as the target device.

In this connection, the first device 10 receives and stores data from the second device 20 at the communication speed 4800 [bps]. Thereafter, when data is transmitted from the third device 30 to the first device 10 at a communication speed of 115200 [bps], the first device 10 detects the start bit from the data transmitted from the third device 30.

The interrupt detection module 200 in the first device 10 measures the pulse width of the start bit using the interrupt signal provided from the interrupt module 120 in the first device using the method shown in FIG. 4 or FIG. 5 described above.

Then, the communication speed calculation module 300 in the first device 10 measures how many pulses may occur for a certain time (for example, one second) in a duration for which the pulse width of the start bit calculated using the Equation 1 is maintained. The communication speed calculation module 300 then calculates the communication speed using the measured number of pulses.

Next, the communication speed switching module 400 in the first device 10 compares the calculated communication speed with the currently set communication speed.

When, from a result of the comparison, the calculated communication speed and the current communication speed are different from each other, the communication speed switching module 400 switches the current communication speed to the calculated communication speed.

Further, when the comparison result shows that the calculated communication speed and the current communication speed are the same, the communication speed switching module 400 maintains the current communication speed.

The first device supports data communication at the varied communication speed and receives and stores the data until the end bit arrives.

As such, the first device 10 may automatically switch the current communication speed to the communication speed requested from another device, that is, the third device, within the speed range supported by the first device 10. That is, data communication of the first device 10 is performed with the second device 20 at a communication speed of 4800 [bps], whereas data communication thereof with the third device 30 is performed at a communication speed of 115200 [bps]. Therefore, the first device 10 may support the low-speed to high-speed communications.

This may remove the problem that the corresponding device that supports high-speed communication is configured to communicate at a low speed to communicate with a low-speed communication device, and, thus, communication of the corresponding device with a high-speed communication device may be performed at a low-speed. Therefore, in the structure in which devices having different communication speeds are connected to the same network, communication speeds of low-speed communication devices as well as communication speeds of high-speed communication devices can be realized. Thus, factors that slow down the overall speed of the network are eliminated, which may provide the fast communication speed across the network.

The present disclosure is intended to cover various modifications, substitutions, and alterations without departing from the spirit and scope of the present disclosure, as would be apparent to one of ordinary skill in the art to which the present disclosure pertains. The scope of the present disclosure is not limited by the embodiments described above and the accompanying drawings.

What is claimed is:

1. A method for switching, by a device, a communication speed in a universal asynchronous receiver-transmitter (UART)-based data communication, the method comprising:
measuring, by an interrupt detection module of the device, a pulse width of a start bit using an interrupt signal;
calculating, by a communication speed calculation module of the device, the communication speed using a time duration for which the measured pulse width is maintained; and
switching, by a communication speed switching module of the device, a current communication speed of the device to the calculated communication speed,
wherein the calculating of the communication speed includes calculating the communication speed by calculating a number of pulses occurring for a predetermined time using the time duration for which the measured pulse width of the start bit is maintained,
wherein the calculating of the communication speed includes calculating the communication speed using a following equation:

$$P_{width} = \frac{1000000 \text{ μs}}{COM_{speed}},$$

where $P_{width}$ indicates the time duration for which the low or high level of the start bit is maintained,
$COM_{speed}$ indicates the communication speed, and
1000000 μs corresponds to one second.

2. The method of claim 1, wherein the measuring of the pulse width includes:
sampling all of interrupt signals occurring from a time of a rising edge of the start bit and for a duration of a high level of the start bit or occurring from a time of a falling edge of the start bit and for a duration of a low level of the start bit; and
measuring the pulse width of the start bit using a number of all of the sampled interrupt signals and a predetermined period in which the interrupt signals are transmitted to the interrupt detection module.

3. The method of claim 1, wherein the measuring of the pulse width includes:
detecting a first interrupt signal and a last interrupt signal among all of interrupt signals, wherein all of the interrupt signals occur from a time of a rising edge of the start bit and for a duration of a high level of the start bit or occur from a time of a falling edge of the start bit and for a duration of a low level of the start bit; and
measuring the pulse width of the start bit using a detection time of the first interrupt signal and a detection time of the last interrupt signal.

4. The method of claim 1, wherein the switching of the current communication speed to the calculated communication speed includes:
comparing the calculated communication speed with the current communication speed;

upon determination from a result of the comparison that the calculated communication speed and the current communication speed are different from each other, switching the current communication speed to the calculated communication speed; or upon determination from a result of the comparison that the calculated communication speed and the current communication speed are the same, maintaining the current communication speed.

5. The method of claim 4, wherein the switching of the current communication speed to the calculated communication speed includes: when an available maximum communication speed of the device is lower than the calculated communication speed, switching the current communication speed to the available maximum communication speed.

6. The method of claim 1, wherein the method further comprises:

supporting data communication at the switched communication speed and receiving data at the switched communication speed; and upon reception of an end bit, terminating a current communication of the device.

7. The method of claim 6, wherein the method further comprises: upon the termination of the current communication, returning the switched communication speed to the current communication speed.

8. The method of claim 2, wherein the predetermined period in which the interrupt signals are transmitted to the interrupt detection module is 8 μs.

9. The method of claim 1, wherein the device receives and stores data from a second device at the current communication speed.

10. The method of claim 9, wherein the method further comprises detecting the start bit from data transmitted from a third device.

* * * * *